United States Patent [19]

Timms

[11] 4,005,822
[45] Feb. 1, 1977

[54] FAN DUCT THRUST REVERSER

[75] Inventor: Richard H. Timms, San Diego, Calif.

[73] Assignee: Rohr Industries, Inc., Chula Vista, Calif.

[22] Filed: Dec. 22, 1975

[21] Appl. No.: 643,492

[52] U.S. Cl. .................. 239/265.31; 244/110 B; 60/226 A

[51] Int. Cl.² ...................................... B64C 15/06

[58] Field of Search .............. 244/230, 110 B; 60/226 R, 226 A, 230; 239/265.29, 265.31, 265.33, 265.37, 265.39, 266.13, 266.19, 266.25, 266.41, 127.3

[56] References Cited

UNITED STATES PATENTS

| 2,950,595 | 8/1960 | Laucher et al. | 239/265.31 |
| 3,497,165 | 2/1970 | Sutton et al. | 239/265.29 |
| 3,503,211 | 3/1970 | Medawar et al. | 239/265.31 |
| 3,612,402 | 10/1971 | Timms et al. | 239/265.29 |
| 3,829,020 | 8/1974 | Stearns | 239/265.29 |
| 3,941,313 | 3/1976 | Jumelle | 244/110 B |

FOREIGN PATENTS OR APPLICATIONS 588,873  12/1959  Canada

Primary Examiner—Trygve M. Blix
Assistant Examiner—Galen L. Barefoot
Attorney, Agent, or Firm—Patrick J. Schlesinger; Frank D. Gilliam

[57] ABSTRACT

A thrust reverser arrangement for a fan-type jet propulsion engine comprising a split cowling surrounding the engine and forming a bypass duct with the engine outer wall. The rear portion of the split cowling is translatable rearward for forming a space between the cowling portions. A translatable sleeve having cascades through portions of its walls is interconnected with the rear portion of the cowling and translates therewith and fills the space between the cowling portions. Blocker doors are interconnected to the rear portion and are rotated into the bypass duct during the terminal rearward movement of the rear portion.

4 Claims, 7 Drawing Figures

U.S. Patent  Feb. 1, 1977  Sheet 1 of 2  4,005,822
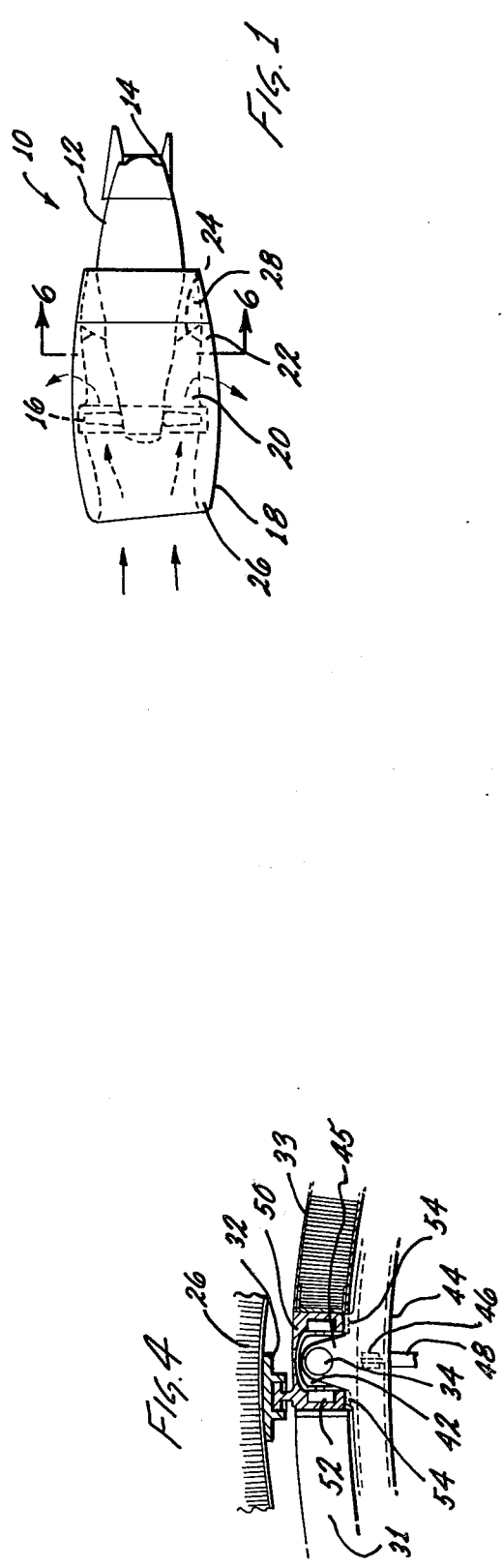
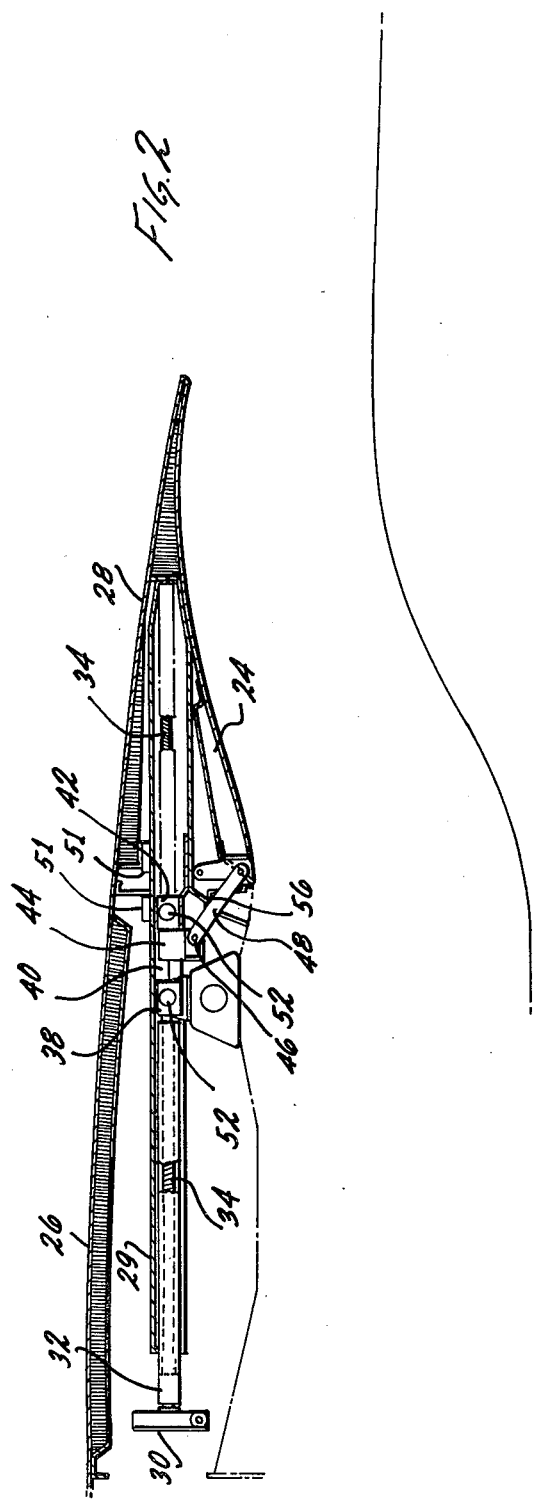

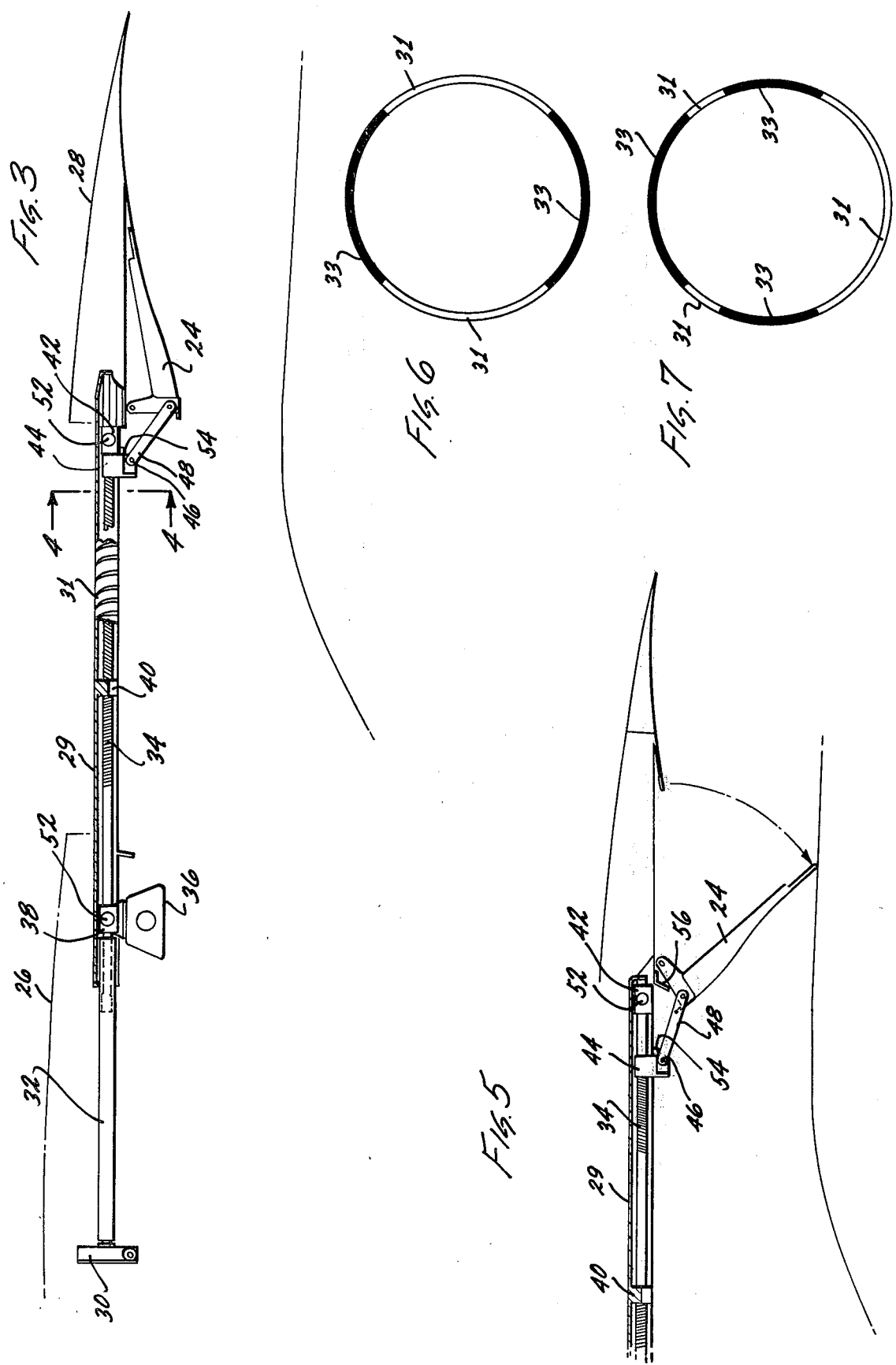

FAN DUCT THRUST REVERSER

BACKGROUND OF THE INVENTION

This invention relates generally to thrust reversers for bypass-fan type jet propulsion engines and more particularly to improvements therein. Various thrust reversers of this type have been developed in the prior art in which a translatable cowl portion is moved to expose a ring of flow reversing cascades to which the normal fluid flow through the bypass duct may be diverted. A plurality of blocker door flaps, which have been rotated into position to block the bypass duct, are used to divert the fan air. In known reversers the amount of structure which translates when the reverser is deployed is sometimes substantial. Not only the rear cowl portion but the blocker doors and various links, etc., move in more than one direction. The actuators and the linkages connecting the actuators to the components to be translated may become extensive and occupy substantial space, not only in the reverser portion of the cowling but in its forward portion also. It is therefore desirable to minimize the translating components in such reversers and, furthermore, to confine the reversing structure to a portion of the cowling.

Yet another problem develops in the reversers of a majority of the prior art when service or maintenance on the jet engine is required. In some of the prior art reversers, substantial disassembly is many times necessary to gain access to the jet engine. It is therefore also desirable to simplify the manner in which engine access is achievable.

Furthermore, the blocker doors should not be deployed until the opening of the passageways for exiting the reverse flow of engine gases external of the aircraft has been completed.

These and other features were not satisfactorily resolved until emergence of the instant invention.

SUMMARY OF THE INVENTION

In accordance with the present invention, there is provided an improved fan duct thrust reverser.

The preferred embodiment of the thrust reverser of the instant invention is characterized by a cowling surrounding the fan and extending co-axially along the central axis of the engine. The cowling is spaced from the engine outer wall to form a bypass duct therewith. The cowling has a translatable rear portion that forms a continuation of the cowl when in the forward stowed position and provides an opening in the cowl for reversing gases to exit when in its deployed position. A translatable sleeve has selected openings about its peripheral surface for the nesting of cascades. The blocker doors are positioned adjacent the opening and pivotally rotate clockwise about their forward edge into the bypass duct for blocking the rearward flow of engine gases. A rotary actuator is employed to translate the sleeve and rear cowl portion. Linkage provides for movement of the blocker doors during the terminal movement of the rear cowl portion while the sleeve translation is terminated in its rearward movement. The blocker doors are locked in a stowed position during normal flight by the nesting of the stowed translating mechanism and the pressure of the rearward flow of engine gas. During the deployment of the sleeve and rear cowl sections the blocker doors one held in a stowed position by the rearward flow of engine gasses alone until they are linkage activated.

The mechanism is simple, light in weight and provides for effective reversal of rearward thrust.

The above and other features of the instant invention will be readily apparent as the description continues while being read in conjunction with the appended drawings.

DESCRIPTION OF THE DRAWINGS

FIG. 1 is an elevation of a fan-type jet propulsion power plant employing the thrust reverser of the present invention.

FIG. 2 is an enlarged cross sectional view of a portion of the preferred embodiment of the thrust reverser in the cruise or stowed position.

FIG. 3 is a view similar to FIG. 2 but showing the translatable sleeve portion in a rearward position with the reverser door stowed.

FIG. 4 is a portion of FIG. 3 taken along lines 4—4.

FIG. 5 is a partial view similar to FIG. 3 with the blocker door in a deployed position.

FIG. 6 is a schematic cross-section of FIG. 1 taken along lines 6—6 showing a first positional placement of the cascades.

FIG. 7 is similar to FIG. 6 showing a second positional placement of the cascades.

DETAILED DESCRIPTION OF THE PREFERRED EMBODIMENT

Throughout the drawings and specifications, the same numerals are used in the various figures to indicate the identical element of part.

Referring now to FIG. 1, a fan type jet propulsion engine 10 is shown. Details of how the engine is attached to an aircraft or other device to be propelled are not shown since they form no part of the present invention. The fan engine comprises the jet engine 12 which discharges a gaseous effluent through nozzle 14 to provide thrust. Thrust in the particular type of engine for which this invention is intended is augmented by air flow from a fan 16 driven by the engine and disposed concentric therewith and extending radially beyond the outer wall thereof. A cowling 18 is spaced from and suitably supported on the engine 10 to form a bypass duct 20 for the flow of fan air. By diverting the fan air and causing it to exit in a direction opposite to that of the normal thrust, the reverse thrust is created. In FIG. 1 the portion of the cowling 22 contains the apparatus necessary for developing the reverse thrust. The doors 24 which are used to block the flow of fan air through the duct are shown schematically in phantom in their deployed position. The arrows generally indicate the flow of duct or fan air during the reverser action.

It should be noted, in FIG. 1, that the cowling 18 is broken into two sections, a forward portion 26 and a rearward or aft portion 28. As will be better understood from the detailed description of the other drawings that follow, within the scope of the invention the entire reverser mechanism is contained within the walls of the cowling 18.

Referring now to FIGS. 2 through 7, the operating mechanism is shown in various operational positions. A rotary drive box 30 is shown. The drive box may be any suitable type having an output drive perpendicular to its input. It should be understood that several of these drive boxes are utilized to practice the invention. The drive boxes employed to practice the invention are generally driven by the same power source so as to insure synchronization; however, separate power sources that can be readily synchronized may be used. A typical source of rotational power includes but is not limited to electric motors, hydraulic motors and the like. It should be understood that the rotational speed of the drive box outputs is relatively slow and, therefore, a speed reduction device may be required between the power sources and the drive boxes or within the drive box gears themselves.

The output shafts of the drive boxes are connected to a torque tube 32 that has internal longitudinal slots commonly called splineways or keyways for receiving splines or keys. A jack screw 34 having splines or keys on the end adjacent the drive box meshes with the splineways or keyways within the torque tube. A mounting bracket 36 is shown attached to the forward portion of the cowling 18. The bracket 36 is conveniently attached within the walls of the cowling. A threaded nut 38 is fixedly attached to the upper portion of the mounting bracket 36 and engages the threads of the jack screw. The torque tube 32 has a length sufficient to reach between the drive box and the threaded nut 38. A thrust bearing 40 is fixedly connected to a cascade bank 31 and fits around the jack screw providing sliding contact therewith so as to allow freedom of relative movement therewith.

The jack screw has threads sloped in one direction on one side of the thrust bearing and threads of opposite directional slope on the other side.

A second threaded nut 42 is attached to the translatable rear cowling portion 28 and engages the threads of the jack screw 34.

An actuating ring 44 surrounds the inner periphery of the cowling and is attached in sliding engagement to each jack screw by a lug 45. The blocker doors 24 are connected at a position 46 above the rear inner surface of ring 44 by a link 48. The link is pivotally attached at each of its ends.

The cascades 31 and panel sections 33, hereinafter described in detail, are attached to a track member 50 having an inverted U configuration. The track member has an upper T flange that provides sliding engagement with a paid of slide fitting 51. One of the slide fittings is carried by the forward position 26 and the other by the aft cowl section 28. This connection permits relative movement between the cascade bank and panels and the aft cowl section. The inner sides of track 50 have slots for receiving rollers 52 attached to both sides of the threaded nuts so that the cascade and panel section can move relative to the fixed threaded nut 38 and the movable threaded nut 42. Stops 54 are provided on the lower track 50 near its outer end portion. The stops prevent rearward movement of ring 44 during the terminal rearward movement of the threaded nut 42 while deploying the blocking doors. The terminal movement having a length substantially equally to that of the link 48.

The blocker doors 24 form the inner aerodynamic profile of the cowl when in their stowed position. As can be seen by the various figures, the blocker doors 24 are pivotally attached to the aft cowl portion 28 for rotational movement relative thereto.

FIGS. 6 and 7 are typical examples of the placement of the cascades and non-cascade or solid wall portions of the continuous ring section 29. In FIG. 6, the cascade portions 31 are placed at the side of the cowling with solid portions 33 comprising the upper and lower portions of the continuous ring section 29. In FIG. 7, a variation is shown with the top and a portion of the sides of the continuous ring section 29 blocked by solid portions 33 while the bottom and at each side between the solid sections the cascades 31 are placed. Any similar placement could be used with equal success to practice the invention. The cascades 31 are the type well known in the art having louvers, as shown by FIG. 3, for turning the flow of gas therethrough toward the front of the aircraft. The solid portions 33 are generally constructed of light weight honeycomb or similar material that has a high strength to weight ratio.

OPERATION OF THE PREFERRED EMBODIMENT

The sequence of operations and translations, etc., which occur when a reverser constructed in accordance with this invention is deployed is shown in the series of FIGS. 2-4.

In FIG. 2 the apparatus is shown in its stowed position wherein all the engine bypass gases exit rearward through duct 24. A seal 56 is provided to prevent these gases from entering the space between the cowl sections at their intersection. The seal is generally a large "O" ring or the like formed from resilient material.

When synchronized rotary force is applied to the drive boxes 30, the torque tube commences to rotate. This rotative movement causes the jack screw to translate rearward along the torque tube by the thread engagement action with fixed ball nut 38. Simultaneously, threaded nut 42 is translated rearward by the action of the jack screw. The aft cowl section 28 attached to the threaded nut 42 translates therewith. The actuating ring 44 follows the initial movement of the aft cowl section 28 by its attachment through link 48 to the aft section. As the cowl section 28 moves rearward, an opening in the cowl is provided and the cascades and solid portions are moved into place in the opening.

The blocker doors 24 are held in their stowed position through substantially the entire translation of the cowl section 28, see FIGS. 2 and 3, by the force of the bypass gases acting thereon in their rearward flow. During the terminal movement of the cowl section 28, as shown by FIG. 4, the stops 54 prevent the actuator ring 44 from having additional rearward movement as the cowl section 28 continues to move rearward. This continued movement of the cowl section and the fixed position of the actuator ring causes the link 48 to pull the blocker door downward until it seals off the rear bypass gas flow when the final movement of the cowl section has terminated. It should be noted that the mechanism provides an opening through the cowl for the bypass gases before the blocker doors begin to move into the duct 14 sealing off the normal rearward gas flow.

It should be obvious that a reversal of the rotation of the jack screw will reverse the action of the mechanism returning it to its stowed position.

It has been seen that the reversing apparatus embodying the present invention is characterized by a simple linear mechanism that deploys and stows the apparatus by a lightweight structure, economical to fabricate and reliable and positive in its movement. The reversal of the bypass gases is exceptionally efficient and there is a minimum of linkage in the operation of the system.

Many changes may be made in details of the instant invention, in the method and materials of fabrication, in the configuration and assemblage of the constituent elements, without departing from the spirit and scope of the appended claims, which changes are intended to be embraced therewithin.

Having thus described the invention, what is claimed as new and useful and desired to be secured by United States Letters Patent is:

1. A thrust reverser for a fan type jet propulsion engine having an outer wall and a fan concentric therewith and extending radially beyond said wall comprising:

a cowling surrounding said fan and extending coaxially along the central axis of said engine in a spaced relationship from said engine outer wall to form a bypass duct, said cowling being separated into forward and downstream portions, said downstream portion translatable rearward to form a gap spacing in said cowling between said portions;

a translatable sleeve with selected openings peripherally disposed therethrough, said openings having cascades therein;

a plurality of blocker doors adjacent said cascades pivotably secured to said downstream portions and rotatably about the forward edge thereof, said doors arranged to rotate into said bypass duct thereby blocking flow through said duct and diverting said flow through said cascades; and translating means supported by said portions and disposed within said cowling for translating said aft portion, said sleeve portion and rotating said doors during the terminal motion of said downstream portion, whereby said cascades are positioned in said gap before said doors divert flow from said duct;

said translating means comprising a plurality of rotating drive means, each of said drive means driving a tube member having longitudinal splineways therein, a jack screw having splines at one end thereof for engaging said splineways, said jack screw translatable longitudinally within said tube member by rotation of said tube member, a first and second threaded nut engaging said jack screw, said first threaded nut fixedly attached to said forward portion for movement of said jack screw by rotation of said drive means, a thrust bearing member positioned intermediate the ends of said jack screw for translation therewith, a track member attached to said thrust bearing for movement therewith, said track member having an inverted U shape, the outer parallel side surfaces of said track member being fixedly attached to said translatable sleeve, the inner parallel sides of said track member having longitudinal cut outs therealong for engaging roller means positioned on said threaded nuts for relative movement therewith, the outer upper surface of said track member having slidable engagement with and supporting said downstream portion, an actuating ring carried by and translatable in a downstream direction by said translatable sleeve and in a forward direction by said second threaded nut, stop means positioned on said track member for terminating the rearward movement of said actuating means and linkage means pivotally attached between said actuating ring and said blocker door so that said blocker door is pulled downward by said linkage means when said jack screw is further rotated after said actuating ring has terminated its downstream travel.

2. The invention as defined in claim 1, wherein said rotating drive means is a powered right angle drive box.

3. The invention as defined in claim 1, wherein one of said first and second threaded nuts has right hand threads while the other has left hand threads.

4. The invention as defined in claim 1, wherein said pluralities of rotating drive means are synchronized.

* * * * *